UNITED STATES PATENT OFFICE.

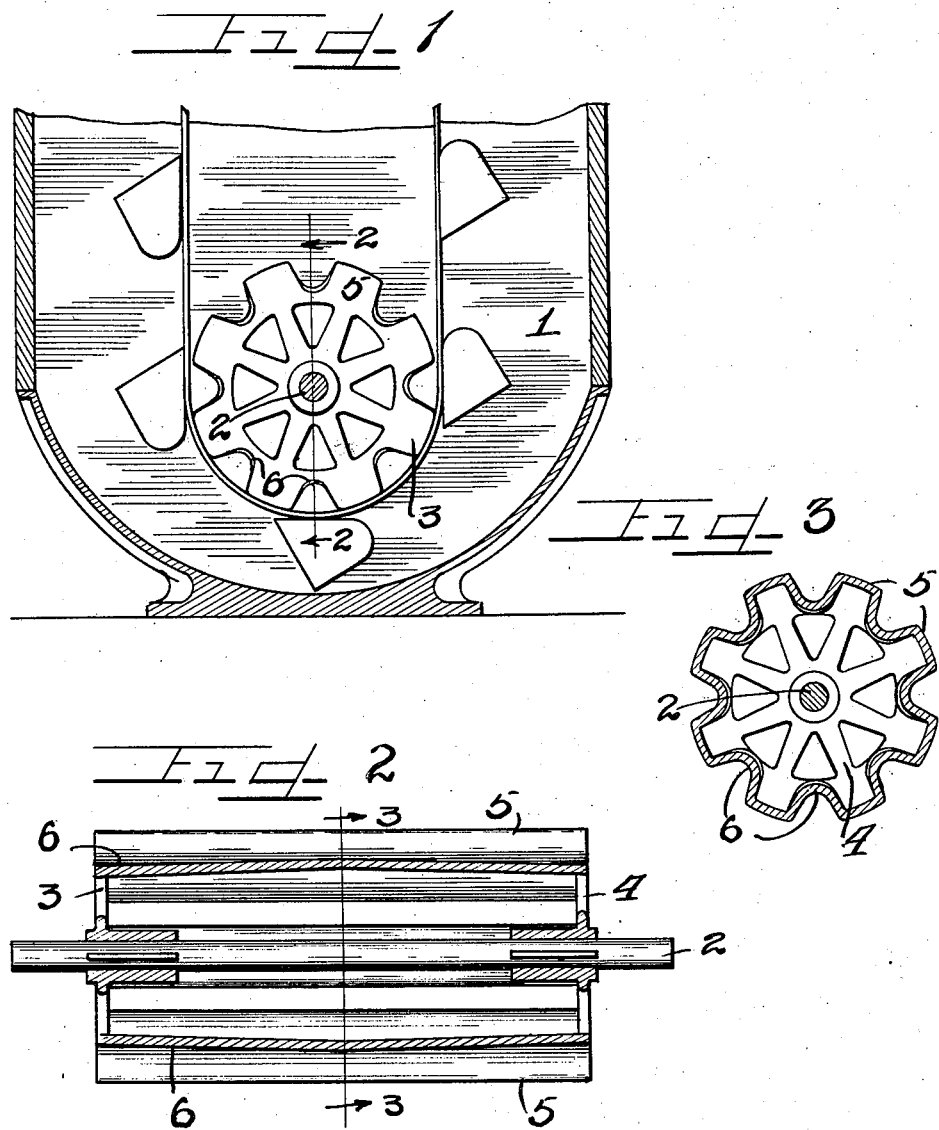

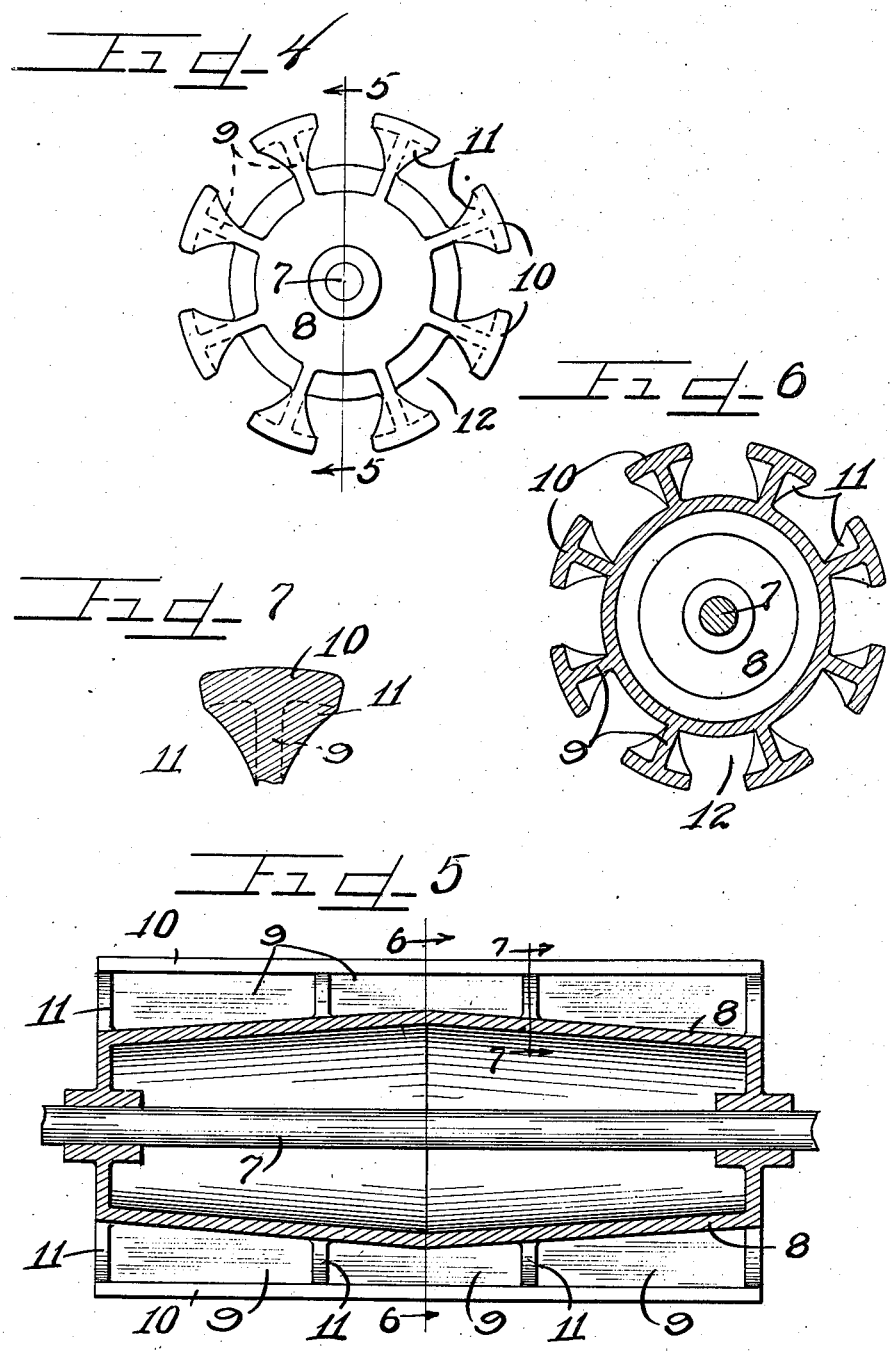

WILLIAM J. BLACK, OF CHICAGO, ILLINOIS.

UNITARY ELEVATING-PULLEY.

1,196,922.   Specification of Letters Patent.   Patented Sept. 5, 1916.

Application filed October 28, 1915. Serial No. 58,336.

*To all whom it may concern:*

Be it known that I, WILLIAM J. BLACK, a citizen of the United States, and a resident of the city of Chicago, in the county of Cook and State of Illinois, have invented certain new and useful Improvements in Unitary Elevating-Pulleys; and I do hereby declare that the following is a full, clear, and exact description of the same, reference being had to the accompanying drawings, and to the numerals of reference marked thereon, which form a part of this specification.

The pulleys generally constructed for bucket elevators and the like, although capable of properly performing the functions of a pulley, have, due to their solid smooth cylindrical tread surface, proven unsatisfactory. When pulleys of this type have been used with conveyer belts of the bucket or scoop types, a certain quantity of the material conveyed or hoisted is spilled and falls between the tread surface of the pulley and the inner surface of the conveyer belt, and there grinds and cuts into the belt, injuring the same. As a result of this grinding and cutting action of the particles thus misplaced, the conveyer belt lasts but a comparatively short time before replacement of the same becomes necessary.

This invention relates to an improved type of elevating or conveying pulley wherein the various parts thereof are all integrally cast or formed to produce a unitary pulley structure, provided with suitable longitudinally disposed parallel grooves in the tread surface, open at both ends to permit material deposited upon the pulley to drop into said grooves in the tread surface and pass off of the pulley through the end openings of the grooves, thus eliminating any possibility of injury to the belt from the material so deposited.

It is an object of this invention to construct a unitary elevating pulley provided with grooves in the outer tread surface open at both ends, adapted to permit material falling upon the tread surface of the pulley to settle in the grooves and pass therefrom through the end openings of the pulley grooves.

It is also an object of this invention to construct a drum shaped elevating pulley having longitudinally disposed grooves in the tread surface thereof, said grooves varying in depth from the center toward the ends and adapted to permit removal of material from the pulley surface to prevent injury or damage to the pulley belt.

It is also an object of this invention to construct a unitary drum pulley consisting of a drum cylinder conically shaped toward both ends and having T-bars integrally formed in parallel longitudinal rows thereon to afford grooves for the removal of material from the surface of the pulley.

It is furthermore an object of this invention to construct an improved type of drum elevating pulley wherein a conical cylindrical member has radially disposed ribs integrally formed thereon, affording grooves therebetween for the removal of material accidentally deposited therein, said ribs at their outer edge having integrally formed curved tread portions to provide a tread surface for a belt.

It is finally an object of this invention to construct an improved type of drum pulley adapted to permit material deposited thereon to be removed without any injury to a belt passing thereover.

The invention (in a preferred form) is illustrated in the drawings and hereinafter more fully described.

On the drawings: Figure 1 is a section through a hopper showing a bucket elevator belt trained about a drum pulley embodying the principles of my invention. Fig. 2 is a sectional view of the pulley taken on line 2—2 of Fig. 1. Fig. 3 is a sectional view taken on line 3—3 of Fig. 2. Fig. 4 is an end view of a modified form of a drum pulley. Fig. 5 is a section taken on line 5—5 of Fig. 4. Fig. 6 is a section taken on line 6—6 of Fig. 5. Fig. 7 is a detail section partly broken away taken on line 7—7 of Fig. 5.

As shown in the drawings: Conventionally shown in Fig. 1 is a hopper or material container 1, of the usual type, and journaled near the bottom thereof is a shaft 2, upon which is keyed or secured in any other suitable manner a unitary cylindrical pulley comprising oppositely disposed spider wheels 3 and 4, forming an integral part of a drum member comprising a longitudinally corrugated tread surface made up of ribs 5, having their outer surfaces curved. Formed between said ribs 5, are grooves 6, which are comparatively shallow at their central portions and gradually increase in depth toward their ends.

In the modified form of my device illustrated in Figs. 4 to 7 inclusive, the reference numeral 7, denotes a shaft upon which is keyed or secured in any suitable manner, a double-conical pulley comprising a drum portion 8, having a maximum circumference at its central portion with its walls converging toward the ends as clearly shown in Fig. 5. Integrally formed on said double-conical drum in parallel relation to each other and equi-distantly spaced around the periphery of said drum are radially disposed ribs 9, having integrally formed on the outer ends thereof curved tread surface members 10, supported and strengthened by means of integral webs 11, spaced equally from each other. Said ribs 9 and tread members 10, afford grooves 12, therebetween with openings at both ends.

The operation is as follows: During the operation of the bucket elevator, if the material conveyed by the buckets spills or is jarred out of said buckets it falls to the bottom of the hopper, and ordinarily the particles of material would lodge between the outer surface of the drum and the inner surface of the conveyer belt. However, due to my improved construction, the material thus deposited on the drum falls into the grooves 12, from which position the material gradually is ejected outwardly at the ends of the pulley into the bottom of the hopper 1.

I am aware that various details of construction may be varied through a wide range without departing from the principles of my invention, and I do not purpose limiting the patent granted otherwise than necessitated by the prior art.

I claim as my invention:

1. In a device of the class described, a drum pulley having parallel ribs integrally formed thereon and extending across the entire surface, the grooves between said ribs being of greater depth at the ends than at the middle.

2. In a device of the class described, a drum conically tapering toward both ends, radial ribs integrally formed thereon, and curved tread members integrally formed on said ribs.

3. In a device of the class described, a conical drum pulley, ribs integrally formed thereon, curved tread members integrally formed on said ribs, and webs integral with said ribs and members to strengthen the same.

In testimony whereof I have hereunto subscribed my name in the presence of two subscribing witnesses.

WILLIAM J. BLACK.

Witnesses:
 CHARLES W. HILLS, Jr.,
 EARL M. HARDINE.